Aug. 24, 1943.    W. J. WALSH    2,327,573
RUBBER IMPREGNATED FIBROUS BODY OF MATERIAL
AND PROCESS OF MAKING THE SAME
Filed May 7, 1942

INVENTOR.
William J. Walsh,
BY Wilkinson Huxley Byron & Knight
attys.

Patented Aug. 24, 1943

2,327,573

UNITED STATES PATENT OFFICE 2,327,573

RUBBER IMPREGNATED FIBROUS BODY OF MATERIAL AND PROCESS OF MAKING THE SAME

William J. Walsh, Burlington, Wis., assignor to Burlington Mills, Inc., Burlington, Wis., a corporation of Wisconsin Application May 7, 1942, Serial No. 442,104

14 Claims. (Cl. 117—65)

The present invention relates to compressed rubber-impregnated fibrous bodies as articles of manufacture, and the process of making the same.

Among the objects of the present invention is to provide, as an article of manufacture, a treated body of fibrous material which is characterized as being impregnated with rubber and compressed, so that the fibres and rubber are in consolidated, bonded relation with one another, whereby the resulting product closely approaches in its physical characteristics vulcanized rubber sheeting, adapting itself to many uses as matting or floor covering for automobiles and the like, as well as for many other articles generally, such as washers, shoe material, etc.

A further object of the invention is to provide a novel process of making the article hereinbefore described.

While it is generally recognized in the art that fibrous material may be impregnated with rubber, latex and the like, and cured by application of heat or the like to form a rather loose composite structure adapting itself to such uses as padding for flooring and the like, nevertheless none of these prior art structures has any degree of resistance to abrasion or high tensile strength, and while the same are flexible and may be bent without failure, nevertheless the fibres of the body are in loose condition and the entire structure has such a degree of porosity that the same has a high water absorption characteristic. The present invention, however, has to do principally with the formation of a compact, solid structure in which the fibres and the impregnated rubber material used in the process are in consolidated bonded relation by virtue of a pressing operation which takes place during vulcanization of the rubber material, so that the final product is greatly decreased in thickness over the fibrous body in its initial condition, thus resulting in a structure which has high abrasive resistance, high dielectric properties, high tensile strength, low water absorbing characteristics, and has the ability to flex and bend without failure.

The invention, while applying generally to fibrous bodies of material, nevertheless is particularly directed to the formation of an article as above described, in which the fibrous body which is used consists of garnetted jute or cattle hair, or any equivalent material, needled to cotton sheeting, burlap and the like. This particular fibrous felted body reinforced by the sheeting or burlap is well-known in the art and merely serves as a raw material for producing an article in accordance with the present invention.

The present invention is further characterized, insofar as the process is concerned, by novel steps involving the impregnation of the fibrous body, as above described, with a compounded water dispersion of rubber hydrocarbon, which includes as one of its elements a suitable vulcanizing agent, and which impregnated material is then vulcanized by the application of heat or the like to mature the rubber hydrocarbon. One of the novel aspects of the present process resides in the subjecting of the impregnated fibrous body of material to pressure while vulcanization takes place.

The present invention further includes as an object, the provision of a rubber impregnated fibrous body of the type herein disclosed and characterized as above set forth, in which the rubber constituents may comprise reclaimed rubber, which is a distinct advantage at the present time because of the scarcity of pure rubber, although it is to be understood that the invention comprehends the use of latex, as well as synthetic rubber of various types.

Other objects, features, capabilities and advantages are comprehended by the invention, as will later appear and as are inherently possessed thereby.

Referring to the drawing—

Figure 1:
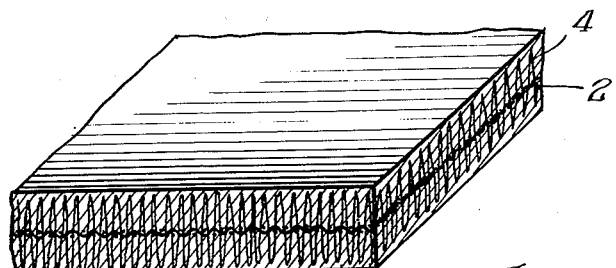
Figure 1 is a fragmentary view in perspective of a body of fibrous material from which the article of manufacture according to the present invention is made.
Figure 3:
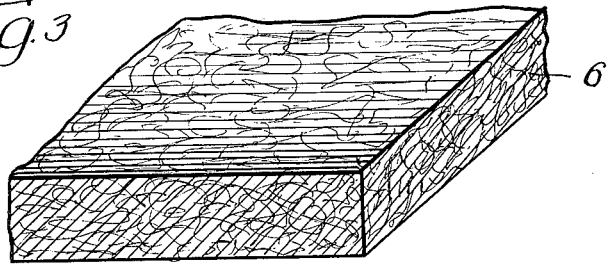
Figure 3 is a fragmentary view in perspective of another body of fibrous material from which the product in accordance with the present invention may be made if desired.

According to the present invention, an article made in accordance therewith may be formed from fibrous stock, as exemplified in Figure 1 of the drawing, which may consist of a reinforcing sheeting 2 of cotton, burlap, or the like, of conventional woven structure, to which jute, cattle hair, or the like 4 is needled thereto in a conventional manner, well-known in the art. Figure 3 further discloses a body of fibrous material 6 which may be used although the reinforced type of material as shown in Figure 1 is far more desirable.

Figure 2:
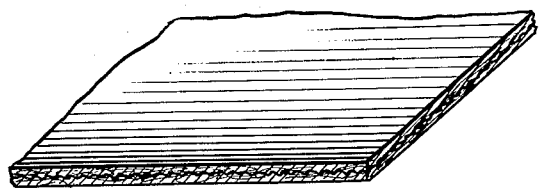
Figure 2 is a fragmentary view in perspective of the impregnated fibrous material made in accordance with the present invention.
Figure 4:
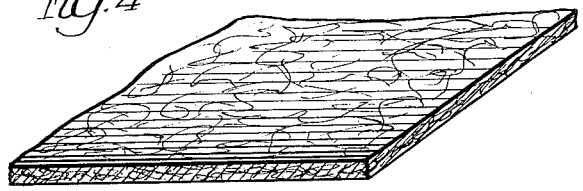
Figure 4 is a fragmentary view in perspective of the finished product according to the present invention, made from the material shown in Figure 3 of the drawing.

The process herein contemplated involves the immersion of the fibrous body of material, as shown in either Figures 1 or 3, in a compounded water dispersion of rubber hydrocarbon for a sufficient period to completely saturate the body of fibrous material. The said body of fibrous material is then passed through pressure rolls to remove the excess solution and to force the solids in the solution into the interstices of the body of fibrous material. The conditioned fibrous body may then be subjected to heat, as by way of a drier, where it is exposed to circulated hot air for a period of time to cause vulcanization of the solution of rubber hydrocarbon. It has been found that the drying should be preferably continued to a point where there is substantially 2% moisture content in the fibrous body, after which partial vulcanization, the material is then subjected to pressure with simultaneous application of heat for a sufficient length of time to complete the vulcanization and to consolidate the bonded relation of the fibres and rubber. This application of pressure may be effected by the usual press methods, either by a platen or an embossing press comprising upper and lower plates, to one or both of which heat may be applied. As an illustration of the invention, the material herein described may be subjected to heat applied to both the upper and lower plates. In addition, the upper plate may be either smooth or engraved in simple designs. When engraved, the design will be transferred to the material during application of heat and pressure. In this embodiment, the lower plate may be either of steel, composition board, or the like. Passage of the partially vulcanized material through these pressure rolls causes a considerable decrease in thickness in the fibrous body of material, as clearly shown in Figures 2 and 4 of the drawing, with the result that the finished product is compact and the rubber and fibres in consolidated bonded relation.

In following the particular process outlined above, the bath in which the fibrous material is immersed may be formed in a number of ways, including various agents, but one such bath which has been particularly effective in producing a satisfactory finished product consists of the following materials in the proportions indicated:

40 gals. reclaimed rubber dispersion (including sulphur as a vulcanizing agent)
3 lbs. colloidal carbon black dispersion
2 lbs. "Aquarex D"
1 lb. 4 oz. "Dowcide A" (sodiumorthophenylphenate)
5 oz. 7½ grams accelerator
2 lbs. mineral oil emulsion.

The reclaimed rubber dispersion above noted, is merely one example of a suitable rubber hydrocarbon, it being understood that this dispersion medium may be of reclaimed rubber, latex or any of the synthetic rubbers. The dispersion medium is further characterized as containing substantially 47½% solid content, of which about 94% is reclaimed rubber.

The colloidal carbon black is provided as a filler and reinforcing medium, as well as having the property of giving color to the resulting structure.

"Aquarex D," sold under that name in the open market, is used as a stabilizing and wetting agent, it being one of the desirable characteristics of the present process that the fibrous material be thoroughly wetted with the compounded water dispersion of rubber hydrocarbon in order to secure uniform coating and impregnation of the fibrous body throughout the entire structure.

"Dowcide A," which is obtained on the open market under that name, is added in the quantities indicated for the purpose of preserving the resulting structure to prevent mildewing and the like.

The accelerator which is added to the bath is for the purpose of accelerating vulcanization and maturing of the rubber to insure proper intimate bonded relation of the fibres and to provide a structure which can be handled easily under all conditions.

Mineral oil emulsion serves as a plasticizer for the rubber hydrocarbon.

While the above described process may be varied in certain of its aspects to provide, for example, for a continuous treatment of the body or sheet of fibrous material, as well as in many other respects, particularly in connection with the compounded bath for treating the said fibrous body or sheet, nevertheless the process in all of its variations is particularly characterized by application of pressure to consolidate the fibrous body of material during the vulcanization of the rubber component. This may include a partial vulcanization, as suggested above, prior to the application of pressure for consolidation purposes, during which latter step the vulcanization is completed to produce the finished article, or other variations of this process may be adhered to, all as contemplated herein, so long as the application of pressure for consolidation purposes is effected during the vulcanization of the rubber component.

As referred to above, the resulting product has the property of being highly abrasive resistant, far in excess of a rubber sheeting, thus making it particularly adapted in lieu of the said rubber matting for floor coverings for automobiles, as well as airplanes and the like. The product also has high dielectric properties, making it useful for other purposes than those noted above, such as electrical insulation and the like.

Its high tensile strength likewise renders the finished product particularly adapted for many general uses. Its flexibility and low water absorption characteristics are further properties that make the resulting product highly desirable for many uses.

While I have herein described and upon the drawing shown illustrative embodiments of the invention and also disclosed a process for making the same, it is to be understood that the invention is not limited thereto, but may comprehend other constructions, details, and features as well as other process steps without departing from the spirit of the invention.

What is claimed is:

1. As a new article of manufacture, a compressed vulcanized rubber impregnated body of interlocking fibres in which the fibres and rubber are in consolidated bonded relation.

2. As a new article of manufacture, a compressed vulcanized rubber impregnated body of fibres including an inner reinforcement of woven fibrous material, and in which the fibres and rubber are in consolidated bonded relation.

3. As a new article of manufacture, a compressed vulcanized rubber impregnated body of fibres including an inner woven fibrous material to which fibres are needled thereto and in which the fibres and rubber are in consolidated bonded relation.

4. The process of forming a rubber impregnated fibrous material, comprising the steps of subjecting a bat of fibrous material to an aqueous dispersion of rubber and a vulcanizing agent, causing a partial vulcanization of said rubber, and causing said rubber to be further vulcanized during a pressing operation to materially decrease the thickness of said bat and to consolidate the bonding relation of said fibres.

5. The process of forming a rubber impregnated fibrous material, comprising the steps of subjecting a body of fibrous material including an inner reinforcement of woven fibrous material to an aqueous dispersion of rubber and a vulcanizing agent, causing a partial vulcanization of said rubber, and causing said rubber to be further vulcanized during a pressing operation to materially decrease the thickness of said body and to consolidate the bonding relation of said fibres.

6. The process of forming a rubber impregnated fibrous material, comprising the steps of immersing a bat of fibrous material in a bath comprising a compounded water dispersion of rubber hydrocarbon and a vulcanizing agent, causing a partial vulcanization of said rubber, and causing said rubber to be further vulcanized during a pressing operation to materially decrease the thickness of said bat and to consolidate the bonding relation of said fibres.

7. The process of forming a rubber impregnated fibrous material, comprising the steps of immersing a body of fibrous material including an inner reinforcement of woven fibrous material in a bath comprising a compounded water dispersion of rubber hydrocarbon and a vulcanizing agent, causing a partial vulcanization of said rubber, and causing said rubber to be further vulcanized during a pressing operation to materially decrease the thickness of said body and to consolidate the bonding relation of said fibres.

8. The process of forming a rubber impregnated fibrous material, comprising the steps of subjecting a bat of fibrous material to an aqueous dispersion of rubber and a vulcanizing agent, causing vulcanization of said rubber in said bat to take place, and subjecting said bat to a pressing operation while vulcanization of said rubber is taking place to materially decrease the thickness of said bat and to consolidate the bonding relation of said fibres.

9. The process of forming a rubber impregnated fibrous material, comprising the steps of subjecting a body of fibrous material including an inner reinforcement of woven fibrous material to an aqueous dispersion of rubber and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

10. The process of forming a rubber impregnated fibrous material, comprising the steps of immersing a body of fibrous material in a bath comprising a compounded water dispersion of rubber hydrocarbon, a wetting agent, a plasticizing agent, and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

11. The process of forming a rubber impregnated fibrous material, comprising the steps of immersing a body of fibrous material including an inner reinforcement of woven fibrous material in a bath comprising a compounded water dispersion of rubber hydrocarbon in which a preponderance of the solid contents thereof is reclaimed rubber, and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

12. The process of forming a rubber impregnated fibrous material, comprising the steps of immersing a body of fibrous material including an inner reinforcement of woven fibrous material in a bath comprising a compounded water dispersion of rubber hydrocarbon, in which substantially 94% of the solid contents thereof is reclaimed rubber, and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

13. The process of forming a rubber impregnated fibrous material, comprising the steps of immersing a body of fibrous material including an inner reinforcement of woven fibrous material in a bath comprising a compounded water dispersion of rubber hydrocarbon and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

14. The process of forming a rubber impregnated fibrous material, comprising the steps of immersing a body of fibrous material including an inner reinforcement of woven fibrous material in a bath comprising a compounded water dispersion of rubber hydrocarbon, a wetting agent, and a vulcanizing agent, causing vulcanization of said rubber in said body to take place, and subjecting said body to a pressing operation while vulcanization of said rubber is taking place to materially decrease the thickness of said body and to consolidate the bonding relation of said fibres.

WILLIAM J. WALSH.